United States Patent [19]

Shustack

[11] Patent Number: 4,932,677
[45] Date of Patent: Jun. 12, 1990

[54] MOBILE COOLER

[76] Inventor: Leonard T. Shustack, Box 803, Rte. 52, Walden, N.Y. 12586

[21] Appl. No.: 356,745

[22] Filed: May 25, 1989

[51] Int. Cl.$^5$ ............................................. B62D 55/06
[52] U.S. Cl. .................................. 280/28.5; 280/5.22; 280/47.26; 280/480.1; 62/457.1; 305/30
[58] Field of Search ................... 280/480.1, 5.22, 28.5, 280/30, 47.26, 47.34, 47.315, 480, 43, 43.24; 180/9.1, 9.22, 9.5; 62/239, 457.1; 305/29, 30

[56] References Cited

U.S. PATENT DOCUMENTS

| | | | |
|---|---|---|---|
| 2,034,472 | 3/1936 | Kesslinger | 62/457.1 X |
| 2,563,108 | 8/1951 | Forbes | 280/28.5 |
| 2,763,489 | 9/1956 | Marsalis | 280/5.22 |
| 2,827,972 | 3/1958 | West | 180/9.22 |
| 3,308,633 | 3/1967 | Kritzer, Jr. | 62/239 |
| 3,591,194 | 7/1971 | Vega | 280/47.26 |
| 3,770,152 | 11/1973 | Niemuth | 280/5.22 X |
| 4,273,222 | 6/1981 | Connelly et al. | 190/18 A |
| 4,581,902 | 4/1986 | Starck et al. | 62/258 |
| 4,724,681 | 2/1988 | Bartholomew et al. | 62/239 |
| 4,729,444 | 3/1988 | Tubman | 180/9.22 |

Primary Examiner—Charles A. Marmor
Assistant Examiner—Brian L. Johnson
Attorney, Agent, or Firm—Benoni O. Reynolds

[57] ABSTRACT

A mobile cooler having a flexible tank track for moving the cooler over sand or irregular ground surfaces. The track members of the flexible tank track are normally made of rubber and are recessed into the outermost surfaces of the side walls of the insulated container to improve appearance of the cooler and to provide minimum obstruction to other articles when the cooler is stored in trunks or other compartments of automobiles. A retractable cord, attached to a spring loaded pulley recessed into the lower front wall of the cooler, facilitates towing of the cooler from place to place in a picnic area. A vertical levelling slot in each of the front axle supports keeps the track members in maximum contact with the surface of the ground during the towing process. Conventional pivotable handles attached to the front and back walls of the insulated container allow the cooler to be easily lifted or lowered in storing or retrieving the unit from storage.

4 Claims, 2 Drawing Sheets

MOBILE COOLER

BACKGROUND OF THE INVENTION (1) Field of Invention

This invention relates to containers for carrying and storing ice, drinks and food while enroute to or from picnics at the beach. More particularly it relates to coolers which can be propelled along a surface on rollers or wheels.

(2) Description of the Prior Art

Most conventional coolers do not have a means of locomotion but are carried to and from the picnic site by handles. Often the containers are heavy, cumbersome and and difficult to maintain on a level keel during the trip from the automobile to the picnic site.

Attempts to provide mobility to refrigerating units usually involved rollers or wheels. In 1967, Kritzer, Jr. (U.S. Pat. No. 3,308,633), discloses small wheels or rollers for transporting his Heating and Cooling System across a supporting surface in elevated relation to that surface.

Vega, in 1971, (U.S. Pat. No. 3,591,194) disclosed an ice chest cart with a plurality of compartments and a pair of wheels attached by an axle to the underside of the cart. The handle, similar to a lawn mower handle, was pivotally attached to a horizontal stub extending from the bottom of the cart midway between the ends.

Other art disclosed an attempt to combine a portable case with a collapsible trolley. Cassimally et al, in 1981, (U.S. Pat. No. 4,273,222) reveals a Combined Portable Case and Luggage Trolley which unfolds to provide a hand truck to carry other luggage. A pair of spring loaded wheels snap out of the bottom of the case to provide a rolling means. A rigid frame unfolds from the top surface of the case to provide a handle.

The most recent prior art discloses a Portable Wheeled Cooler Apparatus which combines the frame handle of Cassimally et al with the wheels of Vega. The refinement, disclosed in 1988 by Bartholomew et al (U.S. Pat. No. 4,724,681), is that the two wheels are mounted so that they do not extend beyond the perimeter of the container until the cooler is pitched forward during towing. The container is also tapered on the ends so that the wheels can be housed in wheel cutout sections for protection during storage.

Although track type treads are known in load carrying vehicles they are used in powered trucks or else used in hand trucks for purposes other than disclosed in the present invention.

Prior art known to this inventor includes the following U.S. Pat. Nos.:

| | | |
|---|---|---|
| 2,763,489 | 9/1956 | Marsalis |
| 2,827,972 | 3/1958 | West |
| 3,308,633 | 3/1967 | Kritzer, Jr. |
| 3,591,194 | 7/1971 | Vega |
| 4,273,222 | 6/1981 | Cassimally et al |
| 4,581,902 | 4/1986 | Starck et al |
| 4,724,681 | 2/1988 | Bartholomew et al |

SUMMARY OF THE INVENTION

The present invention is a Mobile Cooler to provide a storage and cooling means which can be easily towed over sandy or irregular ground as is found on or near the nation's beaches. Prior art coolers had to be physically carried, dragged, or had wheels which offered little traction when deep sand or loose soil was encountered. The present invention overcomes these problems in a single self-contained and easily stowed unit.

According to the preferred embodiment of this invention, a hollow, insulated container is provided for carrying and storing ice or other materials requiring cooling. Attached to the insulated container is a flexible tank track means, to engage the ground, thereby permitting the mobile cooler to be easily rolled over sand or irregular earth. A retractable towing means is mounted in the front of the insulated container for pulling the mobile cooler along the ground and a handle means is attached to the front and rear of the insulated container for lifting and lowering the mobile cooler as it is taken from, or restowed, in the family automobile.

The insulated container of the present invention is rectangular in shape, having side walls each with an outermost surface, a front wall with a recessed area in the lower portion for the retractable towing means, a rear wall, a bottom, and an openable top for easy access.

Flexible tank track means of the present invention is a front horizontal axle, freely rotatable about its own axis and supported from the bottom of the insulated container by one or more front axle supports, a pair of front circular spoked track guides attached to opposite ends of the front horizontal axle, a rear horizontal axle, freely rotatable about its own axis and supported from the bottom of the insulated container by one or more rear axle supports, a pair of rear circular spoked track guides attached to the opposite ends of the rear horizontal axle, a left track member connecting the left front circular spoked track guide and the left rear circular spoked track guide to one another and rotating with both of the circular spoked track guides simultaneously, a right track member connecting the right front circular spoked track guide and the right rear circular spoked track guide and rotating with both of the circular spoked track guides simultaneously.

Retractable towing means of the present invention is a retractable cord attached at one end to a short cylindrical handle and attached at the opposite end to a spring loaded pulley mounted in the recessed area of the lower front wall of the insulated container.

Handle means of the present invention is one or more pivotable handles attached to the front wall and to the rear wall of the insulated container.

Each of the side walls of the insulated container has a track cutout section recessed in the outermost surface, to permit the placement of each of the circular spoked track guides and each of the track members within the respective track cutout sections.

Each of the front axle supports has a vertical levelling slot, allowing the front horizontal axle held therein to move downwardly when the front of the mobile cooler inclines upwardly, thereby keeping the track members in maximum contact with the surface of the ground while the mobile cooler is being towed.

OBJECTIVES OF THE INVENTION

The objectives of the present invention are to provide a mobile cooler for carrying and storing ice, drinks and food enroute to and picnics on a beach, which is:

(1) easy to tow across deep sand or loose soil;

(2) easy to store in an automobile trunk or other compartment without obstructing other articles;

(3) streamlined in appearance, free of obstructing tow handles or wheels;

(4) constructed of plastic or other lightweight but strong insulating material;

(5) level when stored or stationary;

Other objectives and advantages of the present invention will be apparent during the course of the following detailed description.

DETAILED DESCRIPTION OF THE PREFERRED EMBODIMENT OF THE INVENTION

Figure 1:
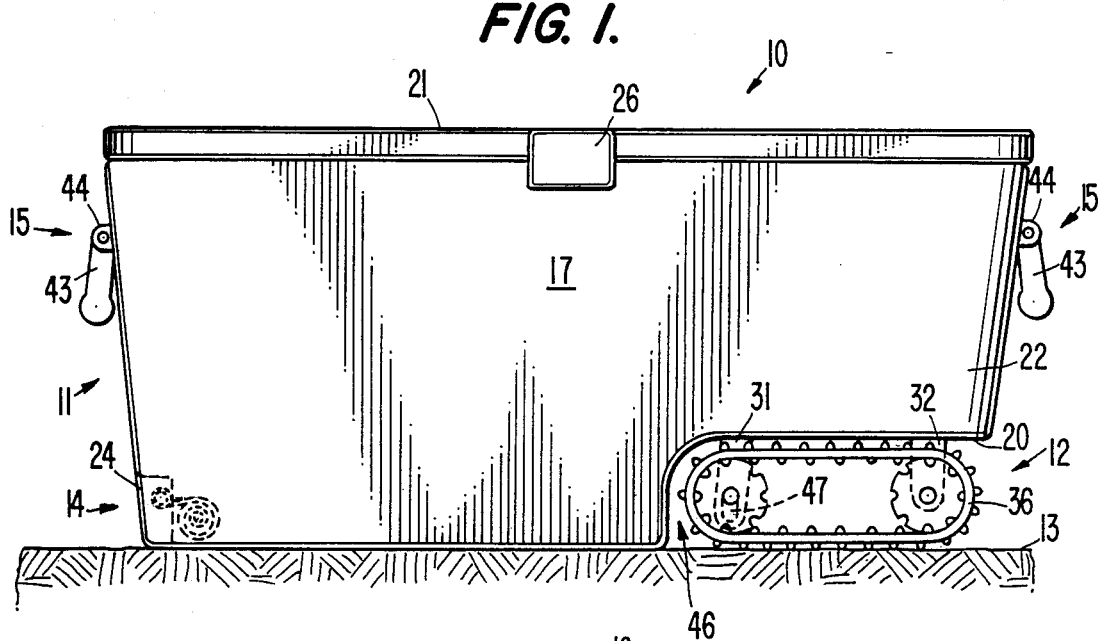
FIG. 1 is an elevational view from the right side of a Mobile Cooler constructed in accordance with the principles of the present invention.

The Mobile Cooler provides a storage and cooling means for use at the beach which means can be easily towed over deep sand or irregular ground surfaces such as are found on or near the nation's beaches. Throughout the following detailed description of the present invention, like reference numerals are used to denote like parts disclosed in the accompanying drawings, FIGS. 1-6.

As shown in FIG. 1, the preferred embodiment of the present invention comprises a hollow, insulated container, shown generally at reference numeral 11, for carrying and storing ice or other materials requiring cooling. Attached to insulated container 11 is a flexible tank track means, shown generally at reference numeral 12, to engage the ground 13, thereby permitting mobile cooler 10 to be easily rolled over sand or irregular earth. A retractable towing means, shown generally at reference numeral 14, is mounted in the front of insulated container 11 for pulling mobile cooler 10 along ground 13. Also, a handle means, shown generally at reference numeral 15, is attached to the front and rear of insulated container 11, for lifting and lowering mobile cooler 10 as it is taken from, or restowed, in the family automobile (not shown).

Figure 2:
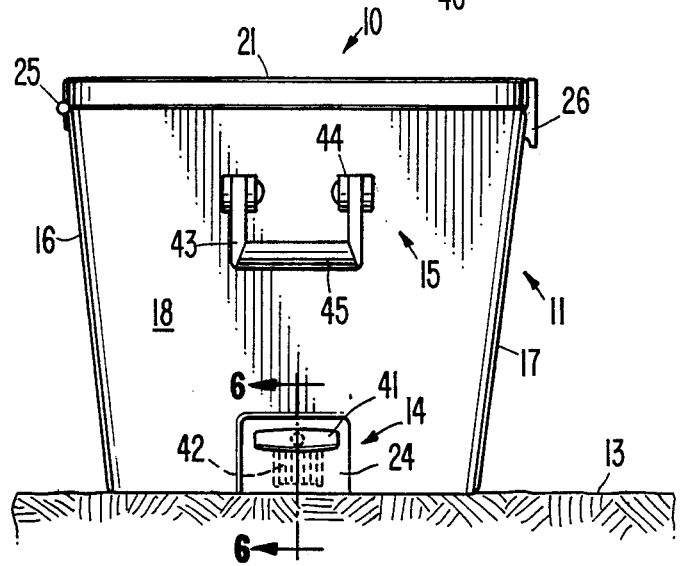
FIG. 2 is a front elevational view of the same present invention showing the front wall with the retractable towing means mounted in the recessed area of the lower portion.

As shown in FIGS. 1 and 2, insulated container 11 of the present invention is rectangular in shape, having side walls, shown generally at reference numerals 16 and 17, a front wall 18, a rear wall 19, a bottom 20 and openable top 21. Side wall 16 and side wall 17 each has an outermost surface 22 and 23, respectively, and front wall 18 has a recessed area 24 in the lower portion, for housing retractable towing means 14. Openable top 21 is hinged on one side 25 and has a quick release latch 26 for easy access to the contents therein. Insulated container 11 is made of a metal or foam plastic material which is lightweight but strong. If of metal, insulated container 11 could have a layer of insulating material between exterior surface 27 of the container and inner liner 28 of the container, as shown best in FIGS. 5 and 6.

Figure 5:
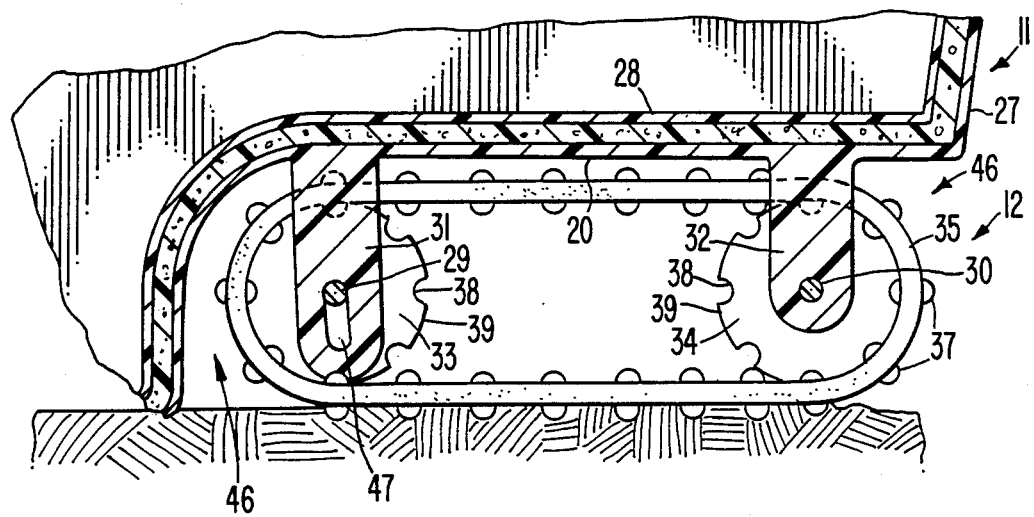
FIG. 5 is a fragmentary side sectional view of the present invention taken along line 5—5 of FIG. 4, showing the front axle support and the rear axle support.

As shown in detail in FIG. 5, flexible tank track means 12 of the present invention is a front horizontal axle 29 and a rear horizontal axle 30, each such axle freely rotatable about its own axis and supported from bottom 20 of insulated container 11 by one or more front axle supports 31 and one or more rear axle supports 32, respectively. A pair of front circular spoked track guides 33 are attached to opposite ends of front horizontal front axle 29 and a pair of rear circular spoked track guides 34 are attached to opposite ends of rear horizontal axle 30. As viewed from front wall 18, left track member 35 connects left front circular spoked track guide 33 with left rear circular spoked track guide 34 to one another and rotates with both of these circular spoked track guides simultaneously. Similarly, right track member 36 connects right front circular spoked track guide (not shown) with right rear circular spoked track guide (not shown) and rotates with both of these circular spoked track guides simultaneously.

Front horizontal axle 29 and rear horizontal axle 30 are made of any light, strong metal, such as steel. Front and rear circular spoked track guides 33 and 34 are made of a strong plastic or of metal, such as steel. Left and right track members 35 and 36 are endless and are made of a flexible material such as rubber. Each flexible track member 35 and 36 has a plurality of studs or treads 37 spaced along the length of the track members. These treads 37 protrude downwardly from track members 35 and 36 to engage the indentations 38 of circular spoked track guides 33 and 34, as the circular spoked track guides rotate with the movement of endless track members 35 and 36 as mobile cooler 10 is moved along ground 13. Spokes 39 of circular spoked track guides 33 and 34 will similarly engage the spaces between treads 37 as track members 35 and 36 revolve about the front and rear circular spoked track guides 33 and 34.

Figure 3:
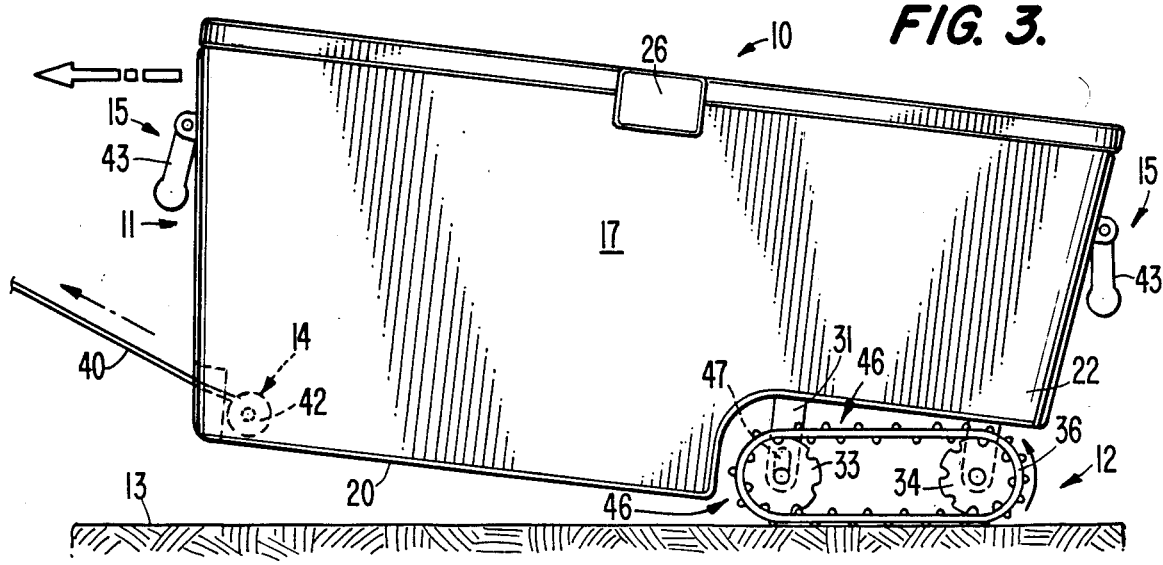
FIG. 3 is an elevational view from the right side of the present invention showing the retractable cord extended and the Mobile Cooler inclined upwardly while being towed.
Figure 4:
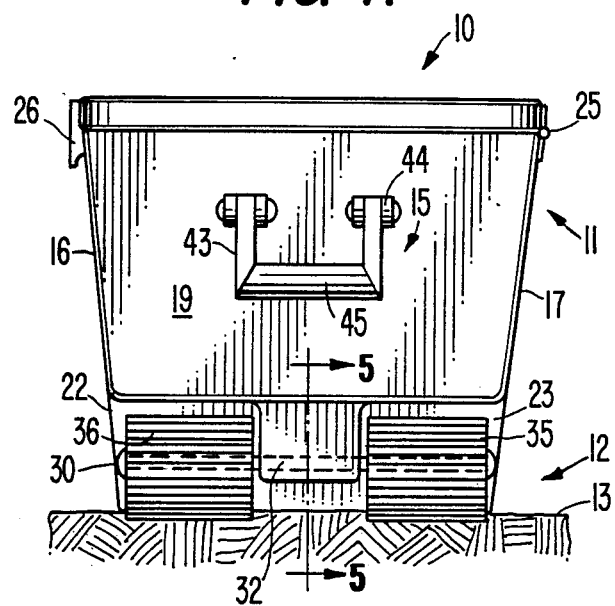
FIG. 4 is a rear elevational view of the present invention showing the rear wall and the rear axle support.
Figure 6:
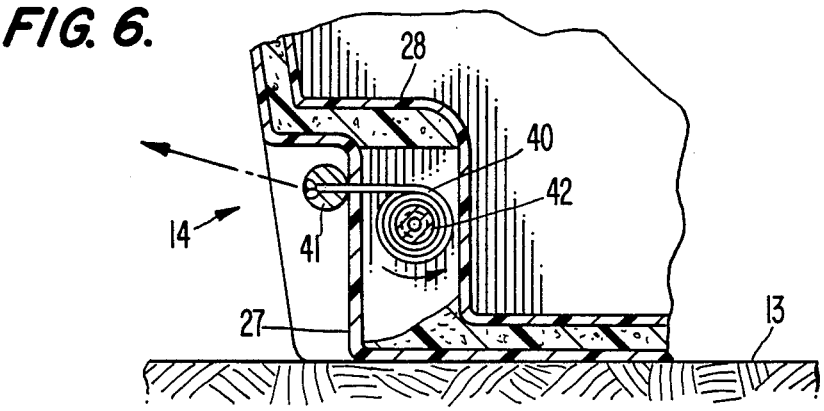
FIG. 6 is a fragmentary side sectional view of the present invention taken along line 6—6 of FIG. 2, showing the retractable towing means.

As shown in FIGS. 2, 3 and 6, retractable towing means 14 of the present invention is a retractable cord 40 attached at one end to a short, cylindrical handle 41 and attached at the opposite end to a spring loaded pulley 42 mounted in recessed area 24 of the lower front wall 18 of insulated container 11. Cylindrical handle 41 is made of plastic or wood and is short enough to nestle in recessed area 24 when retractable cord 40 is retracted. Retractable cord 40 is made of nylon or other water resistant material. When pulled out and upward by a user, retractable cord 40 locks temporarily in an extended position. Also, the location of retractable towing means 14 in the lower portion of front wall 18 causes the horizontal plane of mobile cooler 10 to tilt upwards slightly (See FIG. 3), facilitating the towing of the cooler in a forward direction. Retractable cord 40 is retracted after use by merely pulling the cord slightly downwards against spring loaded pulley 42 and then releasing the cord, like raising a window shade.

Handle means 15 of the present invention is one or more U-shaped, pivotable handles 43 attached by a large hinge 44 to front wall 18 and rear wall 19 of insulated container 11. Pivotable handles 43 could be recessed in these walls or can merely hang downward where they can easily be grasped during the lifting or lowering of mobile cooler 10 during the storage or retrieval process. Pivotable handles 43 should be large enough so that the fingers of a user can easily be inserted around the base member 45 of the handle.

Each of the side walls 16 and 17 of the present invention has a track cutout section, shown generally at reference numeral 46, recessed in their outermost surfaces 22 and 23. This recessing permits the placement of each of the circular spoked track guides 33 and 34, and each of the corresponding track members 35 and 36, within the respective track cutout sections 46 of insulated container 11. In this manner, there are no projecting members to interfere with the storing of mobile cooler 10 flush with other articles in the automobile (not shown) while transporting the cooler to or from the beach. The recessing of flexible tank track means 12 also protects track members 35 and 36 and circular spoked track guides 33 and 34 from damage during use and handling. Also, the recessing serves as a splash guard and enhances the streamlined appearance of the cooler.

Front axle support 31 has a vertical levelling slot 47 allowing front horizontal axle 29 held therein to move downwardly when the front of mobile cooler 10 inclines upwardly (See FIG. 3), thereby keeping track members 35 and 36 in maximum contact with the surface of ground 13 while mobile cooler 10 is being towed.

I claim:
1. A mobile cooler comprising:
    a hollow, insulated container, for carrying and storing ice or other materials requiring cooling, wherein said insulated container is rectangular in shape, having a left side wall and a right side wall with outermost surfaces, a front wall with a recessed area in the lower portion, a rear wall, a bottom and an openable top;
    a flexible tank track means, attached to said insulated container, to engage the ground, thereby permitting said mobile cooler to be easily rolled over sand or irregular earth, wherein flexible track means is:
        a front horizontal axle, freely rotatable and supported from the bottom of said insulated container by front axle supports, wherein each of said front axle supports has a vertical levelling slot, allowing said front horizontal axle held therein to move downwardly when the front of said mobile cooler inclines upwardly,
        a left front circular spoked track guide and a right front circular spoked guide attached to opposite ends of said front horizontal axle,
        a rear horizontal axle, freely rotatable and supported from the bottom of said insulated container by rear axle supports,
        a left rear circular spoked track guide and a right rear circular spoked guide attached to the opposite ends of said rear horizontal axle,
        a left track member connecting the left front circular spoked track guide and the left rear circular spoked track guide to one another and rotating with both said circular spoked track guides simultaneously,
        a right track member connecting the right front circular spoked track guide and the right rear circular spoked track guide and rotating with both said circular spoked track guides simultaneously,
    towing means, attached to said front wall of said insulated container, for pulling said mobile cooler along the ground;
    handle means, attached to said front wall and to said rear wall of said insulated container, for lifting and lowering said mobile cooler.

2. The mobile cooler of claim 1 wherein said left side wall and said right side wall have track cutout sections recessed in said outermost surfaces, to accommodate said circular spoked track guides and said track members within said track cutout sections.

3. The mobile cooler of claim 1 wherein towing means is a retractable cord attached at one end to a short cylindrical handle and attached at the opposite end to a spring loaded pulley mounted in said recessed area of said front wall of said insulated container.

4. The mobile cooler of claim 1 wherein handle means are pivotable handles attached to said front wall and to said rear wall of said insulated container.

* * * * *